United States Patent Office 3,793,365
Patented Feb. 19, 1974

---

3,793,365
AMINO ACID DERIVATIVES
Werner Winter, Viernheim, Hesse, Max Thiel, Mannheim, Kurt Stach and Karl Dietmann, Mannheim-Waldhof, and Wolfgang Bartsch, Mannheim, Germany, assignors to Boehringer Mannheim GmbH, Mannheim, Germany
No Drawing. Filed Apr. 10, 1970, Ser. No. 27,447
Claims priority, application Germany, Apr. 30, 1969,
P 19 22 003.2
Int. Cl. C07c 101/08
U.S. Cl. 260—471 A                 9 Claims

ABSTRACT OF THE DISCLOSURE

New amino acid derivatives of the formula

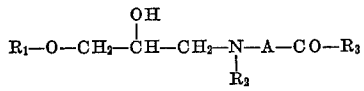

wherein $R_1$ is aryl, such as naphthyl or phenyl, which may be substituted by halogen or hydroxyl, alkoxy, alkenyl, alkenyloxy, alkyl, alkoxyalkyl, trifluoroalkyl, alkylmercapto, alkenylmercapto, amino, alkylsulfonylamino, or acylamino; $R_1$ may also be indenyl or hydrogenated indenyl or hydrogenated naphthyl; $R_2$ is hydrogen or lower alkyl or aralkyl; $R_3$ is hydroxyl or amino or alkoxy, alkylamino or dialkylamino, or an N-piperazyl radical, which may be N'-substituted; and A is an alkylated, or arylated lower alkylene chain, which can carry a further carboxyl or carbalkoxy radical; and the physiologically compatible salts thereof; are outstandingly effective as β-adrenergic agents.

---

The present invention is concerned with new amino acid acid derivatives and to β-adrenergic pharmaceutical compositions containing them.

New amino acid derivatives according to the present invention are compounds of the general formula

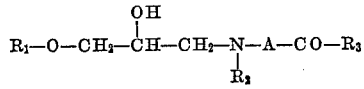

wherein $R_1$ is aryl, such as naphthyl or phenyl, which may be substituted by halogen or hydroxyl, alkoxy, e.g., lower alkoxy, alkenyl, e.g., lower alkenyl, alkenyloxy, e.g., lower alkenyloxy, alkyl, e.g., lower alkyl, alkoxyalkyl, e.g., lower alkoxyalkyl, trifluoroalkyl, e.g., lower trifluoroalkyl, alkylmercapto, e.g., lower alkylmercapto, alkenylmercapto, e.g., lower alkenylmercapto, amino, lower alkyl amino, alkylsulfonylamino, e.g., lower alkylsulfonylamino, or acylamino, e.g., lower acylamino; $R_1$ may also be indenyl or hydrogenated indenyl or hydrogenated naphthyl; $R_2$ is hydrogen or lower alkyl or aralkyl; $R_3$ is hydroxyl or amino or alkoxy, alkylamino or dialkylamino, in which the alkyl groups are, e.g., lower alkyl, or an N-piperazyl radical, which may be N'-substituted; and A is an alkylated, e.g., lower alkylated, or arylated lower alkylene chain, which can also carry a further carboxyl or carbalkoxy, e.g., lower carbalkoxy radical; and the physiologically compatible salts thereof.

The new amino acid derivatives according to the present invention are useful for the preparation of β-adrenergic pharmaceutical compositions.

A series of structurally similar adrenergic compounds is already known (such as propranolol; see also Belgian patent specification No. 716,088 and Dutch patent specification No. 6801661) but the new compounds according to the present invention are distinguished from the known β-receptor blocking agents by an unexpectedly low local anesthetic action and a surprisingly high protective action against hypoxia stresses (glycolysis inhibition), while, at the same time, inducing essentially no side effects.

Those compounds of General Formula I are especially effective in which $R_1$ is unsubstituted naphthyl or in which $R_1$ is phenyl substituted with 1 or 2 halogen atoms and/or alkyl, alkoxy, alkenyl, or alkenyloxy radicals, $R_2$ is hydrogen atom or an alkyl or benzyl radical, $R_3$ is a hydroxyl or amino group or an alkoxy, alkylamino or dialkylamino radical or an N-piperazyl radical, which may be N'-substituted, and A is an alkylated or arylated lower alkylene chain, which can also carry a further carboxyl or carbalkoxy radical.

The new compounds according to the present invention can be prepared, for example, in one of the following ways:

(a) Reaction of epoxides of the general formula:

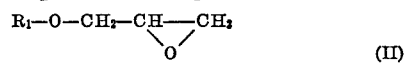                (II)

in which $R_1$ has the same meaning as defined above, with amino acid derivatives of the general formula:

$$R_2\text{—HN—A—CO—}R_3 \qquad (III)$$

in which A, $R_2$ and $R_3$ have the same meanings as defined above, and, when $R_3$ is a hydroxyl group, this is first converted into a salt by reaction with an organic or inorganic base; or (b) Reaction of compounds of the general formula:

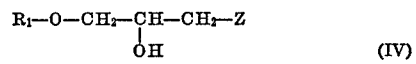                (IV)

in which $R_1$ has the same meaning as defined above and Z is a reactive ester group, with amino acid derivatives of General Formula III; or (c) Reaction of amines of the general formula:

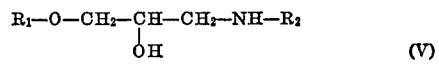                (V)

in which $R_1$ and $R_2$ have the same meanings as defined above, with compounds of the general formula:

$$Z\text{—A—CO—}R_3 \qquad (VI)$$

in which A, $R_3$ and Z have the same meanings as defined above; or (d) Reaction of tetrahydro-oxazinones of the general formula:

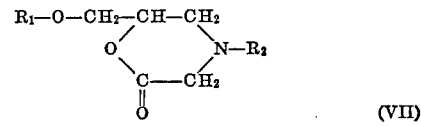                (VII)

in which $R_1$ and $R_2$ have the same meanings as defined above, with compounds of the general formula:

$$H\text{—}R_3$$

in which $R_3$ has the same meaning as defined above, and, when $R_2$ in the product obtained is a hydrogen atom, that is, if desired, N-alkylated in known manner or, when $R_2$ is a benzyl radical, that is, if desired, debenzylated in known manner and the grouping —CO—$R_3$ in the product obtained is, if desired, changed by saponification, esterification, transesterification or amidation and free bases or acids of General Formula I are, if desired, converted into pharmacologically compatible salts by reaction with acids and bases, respectively.

The saponification of compounds of General Formula I in which $R_3$ is an alkoxy, amino, alkylamino, dialkylamino or piperazyl radical and/or in which A carries a carbalkoxy radical can be carried out in known manner with aqueous acids or bases: in the latter case, salts of the new Compounds I are obtained directly.

The esterification of Compounds I in which $R_3$ is a hydroxyl group and/or A carries a carboxyl group, can be carried out under dehydrating conditions by reaction with an excess of the desired alcohol. The dehydration of the reaction mixture can be achieved by azeotropic distillation with a solvent serving as an entraining agent, such as methylene chloride or benzene, or by the addition of dehydrating substances, such as concentrated sulfuric acid, hydrogen chloride or boron trifluoride etherate. In principle, it is also possible to esterify free carboxyl groups by reaction with diazoalkanes.

The transesterification of Compounds I, in which $R_3$ is an alkoxy radical, can be carried out in an excess of the anhydrous alcohol to be introduced as the ester component, with the addition of catalytic amounts of a mineral acid, such as hydrogen chloride or concentrated sulfuric acid.

Furthermore, Compounds I in which $R_3$ is an alkoxy radical can easily be converted into amides by reaction with ammonia or amines.

For the N-alkylation of Compounds I in which $R_2$ is a hydrogen atom, alkyl and aralkyl halides and sulfates or tosylates are especially suitable, the reaction expediently being carried out in a high boiling inert solvent, such as dimethyl sulfoxide or dimethyl formamide.

The splitting off of a benzyl radical $R_2$ can easily be carried out by catalytic hydrogenation, using the conventional catalysts, such as Raney nickel or palladium-charcoal, in polar solvents.

For the conversion of the free acids (III) into the salts used in preparation (a), there are preferably used strongly basic metal hydroxides, such as alkali metal and alkaline earth metal hydroxides; however, organic bases, such as trialkylamines, can also be used.

As compounds of General Formulae IV and VI with a reactive ester group Z, it is preferred to use the halides. However, in principle, it is also possible to use reactive sulfonic acid esters, for example, tosylates, mesylates or brosylates.

All the above-described preparations are preferably carried out in a polar solvent. Solvents which can be used for this purpose include, in particular, dimethyl formamide and tetrahydrofuran, as well as isopropanol, n-propanol and other lower alcohols; however, since the intermediates, as well as the end products, are not very sensitive, most of the reactions can be carried out in the melt, without the use of a solvent.

The tetrahydro-oxazinones of General Formula VII can be obtained by the reaction of compounds of General Formula V with compounds of General Formula VI in the presence of a strong base.

Since the compounds of General Formula I possess at least one asymmetric carbon atom, the possibility exists of obtaining the D- or L-isomers in the diastereomers in known manner by racemate splitting with optically-active adjuvants or by fractional crystallization of diastereomeric forms. Of course, it is also possible to direct the syntheses ab initio in a particular stereospecific direction by, for example, the use of optically-active amino acid derivatives of General Formula III.

The pharmacologically compatible salts of the Compounds I can be prepared, for example, by the neutralization of the free amino groups of the Compounds I with non-toxic inorganic or organic acids. For this purpose, there can be used, for example, hydrochloric acid, sulfuric acid, phosphoric acid, hydrobromic acid, acetic acid, lactic acid, citric acid, oxalic acid, malic acid, salicylic acid, malonic acid, maleic acid or succinic acid. When $R_3$ is a hydroxyl group and/or the radical A carries a carboxyl group, pharmacologically compatible salts can be obtained by reaction with a strong base, preferably with an alkali metal or alkaline earth metal hydroxide.

The present invention also includes pharmaceutical compositions which contain, as active ingredient, at least one Compound I and/or a salt thereof, in admixture with a solid or liquid pharmaceutical carrier or diluent. These compositions can be administered enterally or parenterally. As injection medium it is preferred to use water which contains the additives usual for injection solutions, such as stabilizing agents, solubilizing agents and/or buffers. Additives of this type include, for example, tartrate and citrate buffers, ethanol, complex-forming agents, such as ethylene-diamine-tetraacetic acid and the non-toxic salts thereof, high molecular weight polymers, such as liquid polyethylene oxide for viscosity regulation. Solid carriers include, for example, starch, lactose, mannitol, methylcellulose, talc, highly dispersed silicic acids, high molecular weight fatty acids, such as stearic acid, gelatine, agar-agar, calcium phosphate, magnesium stearate, animal and vegetable fats, solid high molecular weight polymers, such as polyethylene glycols; for oral administration, the composition can, if desired, also contain sweeting and/or flavoring agents.

The following examples are given for the purpose of illustrating the present invention and are in nowise to be construed as a limitation thereof.

EXAMPLE 1

N-[1-(2,4-dichlorophenoxy)-2-hydroxy-propyl]-L-α-alanine (Compound 1)

13.35 grams (0.15 mole) L-α-alanine and 6.0 grams (0.15 mole) sodium hydroxide were heated together in 125 ml. dimethyl formamide until complete dissolution was obtained. 32.8 grams 2,4-dichlorophenoxy-glycide ether were then added dropwise, whereafter the reaction mixture was heated for 4 hours to 120° C. The reaction mixture was then evaporated, the precipitated sodium salt was dissolved in water and the solution neutralized with 1 N hydrochloric acid. The precipitate which was hereby formed was filtered off with suction, dried, boiled up with 75 ml. methanol and filtered off. There were thus obtained 35 grams (75.8% of theory) N-[1-(2,4-dichlorophenoxy)-2-hydroxy-propyl]-L-α-alanine, which has a melting point of 224° C. (decomp.).

The compounds set out in the following Table I were prepared in an analogous manner.

TABLE I

| Compound Number | Compound chemical name | M.P., °C. | Yield, percent |
|---|---|---|---|
| 2 | N-[1-(3-methyl-phenoxy)-2-hydroxy-propyl]-D,L-α-alanine. | [1] 208 | 60 |
| 3 | N-[1-(3-methyl-phenoxy)-2-hydroxy-propyl]-L-α-alanine. | 218–220 | 55 |
| 4 | N-[1-(3-methyl-phenoxy)-2-hydroxy-propyl]-D,L-α-leucine. | 216–217 | 58 |
| 5 | N-[1-(3-methyl-phenoxy)-2-hydroxy-propyl]-L-α-isoleucine. | 208–210 | 55 |
| 6 | N-[1-(3-methyl-phenoxy)-2-hydroxy-propyl]-D,L-α-valine. | 218–219 | 69 |
| 7 | N-[1-(3-methyl-phenoxy)-2-hydroxy-propyl]-L-α-phenyl-alanine. | 208–209 | 53 |
| 8 | N-[1-(2-allyloxy-phenoxy)-2-hydroxy-propyl]-D,L-α-alanine. | 198 | 48 |
| 9 | N-[1-(2-allyl-phenoxy)-2-hydroxy-propyl]-D,L-α-alanine. | 190 | 52 |
| 10 | N-[1-(2-bromophenoxy)-2-hydroxy-propyl]-D,L-α-alanine. | 203–204 | 71 |
| 11 | N-[1-(2,5-dichlorophenoxy)-2-hydroxy-propyl]-D,L-α-alanine. | 201–202 | 91 |
| 12 | N-[1-(2-bromophenoxy)-2-hydroxy-propyl]-L-α-phenyl-alanine. | 206–208 | 68 |
| 13 | N-[1-(2,3-dichlorophenoxy)-2-hydroxy-propyl]-D,L-alanine. | 202 | 58 |
| 14 | N-[1-(α-naphthyloxy)-2-hydroxy-propyl]-D,L-α-alanine. | 189–190 | 74 |
| 15 | N-[1-(α-naphthyloxy)-2-hydroxy-propyl]-L-α-alanine. | 202–203 | 77 |
| 16 | N-[1-(α-naphthyloxy)-2-hydroxy-propyl]-D-α-alanine. | 177–178 | 48 |

See footnotes at end of table.

TABLE I—Continued

| Compound Number | Compound chemical name | M.P., °C. | Yield, percent |
|---|---|---|---|
| 17 | N-[1-(α-naphthyloxy)-2-hydroxy-propyl]-D,L-α-phenyl-alanine. | 201–203 | 52 |
| 18 | N-[1-(α-naphthyloxy)-2-hydroxy-propyl]-D,L-α-valine. | 215–217 | 50 |
| 19 | N-[1-(α-naphthyloxy)-2-hydroxy-propyl]-D,L-leucine. | 202–204 | 58 |
| 20 | N-[1-(α-naphthyloxy)-2-hydroxy-propyl]-D,L-isoleucine. | 213–215 | 63 |
| 21 | N-[1-(α-naphthyloxy)-2-hydroxy-propyl]-glycine. | [2] 110 | 43 |
| 22 | N-[1-(α-naphthyloxy)-2-hydroxy-propyl]-D,L-α-aminobutyric acid. | 211–212 | 65 |
| 23 | N-[1-(α-naphthyloxy)-2-hydroxy-propyl]-sarcosine. | 180 | 45 |
| 24 | N-[1-(α-naphthyloxy)-2-hydroxy-propyl]-N-isopropyl-glycine. | ([2]) | 84 |
| 25 | N-[1-(α-naphthyloxy)-2-hydroxy-propyl]-D,L-β-aminobutyric acid. | [3] 169–171 | 52 |
| 26 | N-methyl-N-[1-naphthyloxy)-2-hydroxy-propyl]-D,L-α-alanine. | ([4]) | 61 |
| 27 | N-isopropyl-N-[1-(α-naphthyloxy)-2-hydroxy-propyl]-D,L-α-alanine. | ([4]) | 53 |
| 27a | N-[1-(α-naphthyloxy)-2-hydroxy-propyl-α-amino-isobutyricacid. | 243–244 | 66.7 |
| 27b | N-[1-(2-allyl-phenoxy)-2-hydroxy-propyl-α-amino-isobutyricacid. | 202–203 | 67.0 |

[1] Decomp. [2] Amorphous. [3] Oxalate. [4] Amorphous, no salt.

EXAMPLE 2

N-[1-(α-naphthyloxy)-2-hydroxy-propyl]-N-isopropyl-glycine (Compound 24)

15 grams (0.05 mole) 2-α-naphthyloxy-methyl-4-isopropyl-tetrahydro-oxazine-6-one were boiled under reflux for 5 hours with 6 grams (0.15 mole) sodium hydroxide, 30 ml. water and 100 ml. isopropanol. The lactone ring was hereby opened and, by the addition of 10 N sodium hydroxide solution, there was obtained the sodium salt of N-[1-(α-naphthyloxy) - 2 - hydroxy-propyl]-N-isopropyl-glycine in a yield of more than 90%.

The 2-α-naphthyloxy-methyl - 4 - isopropyl-tetrahydro-oxazine-6-one used as starting material was obtained by the reaction of 38.8 grams (0.15 mole) N-[1-(α-naphthyloxy) - 2 - hydroxy-propyl]-isopropylamine with 23 grams (0.15) mole methyl bromoacetate in the presence of 19.5 grams (0.15 mole) diisopropyl-ethylamine in 150 ml. tetrahydrofuran. The reaction mixture was boiled under reflux for 4 hours, the precipitated hydrobromide was subsequently filtered off and the filtrate evaporated in a vacuum. The residue was recrystallized from isopropanol and ligroin and there were obtained 44.1 grams (98% of theory) 2-α-naphthyloxy-methyl-4-isopropyl-tetrahydro-oxazine-6-one. After recrystallization from isopropanol/ligroin it had a melting point of 78–79° C.

EXAMPLE 3

N-[1-(2,3-dichlorophenoxy)-2-hydroxy-propyl]-D,L-α-alanine methyl ester (Compound 28)

6.16 grams (0.02 mole) N-[1-(2,3-dichlorophenoxy)-2-hydroxy-propyl]-D,L-α-alanine were boiled under reflux for 10–14 hours in 50 ml. methanolic hydrochloric acid. After stripping off the solvent, the residue was triturated with ethyl acetate and, after filtering off, there were obtained 3.58 grams (50% of theory) N-[1-(2,3-dichlorophenoxy)-2-hydroxy-propyl]-D,L-α-alanine methyl ester, which had a melting point of 144–146° C.

In an analogous way, there was obtained N-[1-(α-naphthyloxy) - 2 - hydroxy-propyl]-D,L-α-alanine methyl ester in an amorphous form and in a yield of 58% (Compound 28a).

EXAMPLE 4

N-[1-(3-methyl-phenoxy)-2-hydroxy-propyl]-sarcosine isopropyl ester (Compound 29)

9.8 grams (0.075 mole) sarcosine isopropyl ester were heated with 13.1 grams (0.08 mole) 3-methyl-phenoxy-glycide ether for 4 hours at 100–120° C. and the reaction mixture subsequently distilled in a high vacuum. From the fraction which distills over at 160–164° C./0.2 mm. Hg, there was obtained 15.4 grams (65.3% of theory) N-[1-(3-methyl-phenoxy) - 2 - hydroxy-propyl]-sarcosine isopropyl ester.

The compounds set out in the following Table II were obtained in an analogous manner.

TABLE II

| Compound Number | Compound chemical name | B.P., °C./mm. Hg | M.P., °C. | Yield, percent |
|---|---|---|---|---|
| 30 | N-[1-(2,3-dichlorophenoxy)-2-hydroxy-propyl]-D,L-α-alanine isopropyl ester. | 190–193/0.01 | 104 | 53 |
| 31 | N-[1-(2-bromophenoxy)-2-hydroxy-propyl]-D,L-α-alanine isopropyl ester. | 170–180/0.01 | | 57 |
| 32 | N-[1-(2,3-dichlorophenoxy)-2-hydroxy-propyl]-L-α-alanine isopropyl ester. | 192–194/0.05 | | 68 |
| 33 | N-[1-(2-bromophenoxy)-2-hydroxy-propyl]-L-α-alanine isopropyl ester. | 177–180/0.01 | | 55.6 |
| 34 | N-[1-(3-methoxy-phenoxy)-2-hydroxy-propyl]-D,L-α-alanine ester. | 181–182/0.1 | | 59 |
| 35 | N-[1-(3-methyl-phenoxy)-2-hydoxy-propyl]-D,L-α-phenyl-alanine ethyl ester. | | [1] 126–128 | 63 |
| 36 | N-[1-(3-methyl-phenoxy)-2-hydroxy-propyl]-L-aspartic acid diethyl ester. | | [1] 127–128 | 54 |
| 37 | N-[1-(3-methyl-phenoxy)-2-hydroxy-propyl]-D,L-α-alanine isopropyl ester. | 159–161/0.01 | | 66 |
| 38 | N-[1-(α-naphthyloxy)-2-hydroxy-propyl]-D,L-α-alanine isopropyl ester. | 210–220/0.01 | | 60.6 |
| 39 | N-[1-(α-naphthyloxy)-2-hydroxy-propyl]-D,L-α-phenyl-alanine ethyl ester. | | [1] 168–170 | 63 |
| 40 | N-[1-(α-naphthyloxy)-2-hydroxy-propyl]-L-leucine ethyl ester. | | [1] 152–153 | 47 |
| 41 | N-[1-(α-naphthyloxy)-2-hydroxy-propyl]-L-aspartic acid diethyl ester. | | [1] 125–127 | 66 |
| 42 | N-[1-(α-naphthyloxy)-2-hydroxy-propyl]-L-α-alanine isopropyl ester. | 205–210/0.05 | | 63 |
| 43 | N-[1-(α-naphthyloxy)-2-hydroxy-propyl]-glycine isopropyl ester. | | [1] 163–164 | 48 |
| 44 | N-[1-(α-naphthyloxy)-2-hydroxy-propyl]-D,L-α-alanine methyl ester. | | ([2]) | 53 |
| 45 | N-[1-(2-allyl-phenoxy)-2-hydroxy-propyl-3]-D,L-α-alanine isopropyl ester. | 163–166/0.01 | | 62 |

[1] Hydrochloride. [2] Amorphous, hydrochloride.

EXAMPLE 5

N-[1-(3-methyl-phenoxy)-2-hydroxy-propyl]-N-isopropyl-glycine isopropylamide (Compound 46)

10.5 grams (0.04 mole) 2-(3-methyl-phenoxy)-methyl-4-isopropyl-tetrahydro-oxazine-6-one, together with 20 ml. isopropylamines, were heated under reflux for 5 hours in 75 ml. isopropanol. The reaction mixture was subsequently evaporated in a vacuum and the residue mixed with an ether solution of maleic acid, the N - [1 - (3 - methyl-phenoxy) - 2-hydroxypropyl) ]-N-isopropyl-glycine isopropylamide thereby precipitating out in the form of its maleate. The yield was 14.35 grams (82% of theory) and the salt had a melting point of 82–84° C.

The 2-(3-methyl-phenoxy) - methyl - 4-isopropyl-tetrahydro-oxazine-6-one used as starting material was obtained by the reaction of 0.5 mole 3-methyl-phenoxyglycide ether with 0.5 mole N-isopropyl-glycine methyl ester in the presence of a strong, sterically hindered base (diisopropyl-ethylamine) in 75 ml. tetrahydrofuran. The reaction mixture was boiled under reflux for 5 hours and, after stripping off the solvent, the residue was subjected to vacuum distillation. In the boiling range of 171–172° C./0.1 mm. Hg, 9.1 grams (69%) of theory) 2-(3-methyl-phenoxy) - methyl - 4 - isopropyltetrahydro-oxazine-6-one distilled over.

In an analogous manner, there were obtained the compounds set out in the following Table III, which are isolated either as the free bases or as salts.

TABLE III

| Compound Number | Compound chemical name | Solvent | M.P., ° C. | Yield, percent |
|---|---|---|---|---|
| 47 | N-[1-(3-methyl-phenoxy)-2-hydroxy-propyl]-glycine-N-phenyl-piperazide. | Isopropanol. | [1] 104–105 | 88.5 |
| 48 | N-[1-(3-methyl-phenoxy)-2-hydroxy-propyl]-glycinamide. | Tetrahydrofuran. | [1] 91–92 | 71.5 |
| 49 | N-[1-(2,3-dichlorophenoxy)-2-hydroxypropyl]-glycinamide. | ......do...... | [1] 151 [4] 91; [5] 53.8 |  |
| 50 | N-[1-(2,3-dichlorophenoxy)-2-hydroxypropyl]-sarcosine isopropylamide. | Isopropanol. | [2] 109 | 86.8 |
| 51 | N-[1-(2,3-dichlorophenoxy)-2-hydroxypropyl]-N-isopropylglycine isopropylamide. | ......do...... | [2] 161–163 | 70.5 |
| 52 | N-[1-(3-methoxy-phenoxy)-2-hydroxy-propyl-N-isopropyl-glycinamide. | Tetrahydrofuran. | [1] 77–79 | [4] 99.4; [6] 73.6 |
| 53 | N-[1-(3-methoxy-phenoxy)-2-hydroxy-propyl] N-isopropyl-glycine isopropyl amide. | Isopropanol. | [2] 110 | 61.5 |
| 54 | N-[1-(α-naphthyloxy)-2-hydroxy-propyl]-N-isopropyl-glycinamide | Tetrahydrofuran. | [1] 116–117 | 76.2 |
| 55 | N-[1-(α-naphthyloxy)-2-hydroxy-propyl]-N-isopropyl-glycine isopropyl-amide. | Isopropanol. | [1] 92–92 | 60. |
| 56 | N-[1-(α-naphthyloxy)-2-hydroxy-propyl]-N-isopropyl-glycine phenylpiperazide. | ......do...... | [3] 177 | 55 |
| 57 | N-[1-(α-naphthyloxy)-2-hydroxy-propyl]-D,L-α-alanine methylamide. | Tetrahydrofuran. | [2] 211–213 | 71 |
| 58 | N-[1-(α-naphthyloxy)-2-hydroxy-propyl-3]-D,L-α-alaninamide. | ......do...... | [2] 200–201 | 75 |
| 59 | N-isopropyl-N-[1-(α-naphthyloxy)-2-hydroxypropyl]-D,L-alanine isopropylamide. | Isopropanol. | [2] 177–178 | 58 |

[1] Base.  [2] Hydrochloride.  [3] Oxalate.  [4] Crude product.  [5] Isopropanol.  [6] Cyclohexane.

EXAMPLE 6

N-[1-(3-methyl-phenoxy)-2-hydroxy-propyl]-N-benzyl-glycinamide (Compound 60)

18.7 grams (0.06 mole) 2-(3-methyl-phenoxy)-methyl-4-benzyl-tetrahydro-oxazine-6-one were dissolved in 30 ml. tetrahydrofuran and slowly added dropwise to 50 ml. liquid ammonia. The reaction mixture was then stirred for 2 hours and, after evaporation of the ammonia, was concentrated. There were obtained 19.0 grams (96% of theory) N-[1-(3-methyl-phenoxy)-2-hydroxy-propyl]-N-benzyl-glycinamide in the form of a non-crystallizing oil.

The 2 - (3 - methyl-phenoxy)-methyl - 4-benzyl-tetrahydrooxazine-6-one used as starting material was obtained by the reaction of 39.3 grams (0.145 mole) 3-methyl-phenoxy-glycide ether with 0.145 mole N-benzyl-glycine methyl ester. The reaction mixture was heated for 4 hours at 125° C. and, after cooling, mixed with tetrahydrofuran; 2 - (3-methyl-phenoxy)-methyl-4-benzyl-tetrahydro-oxazine-6-one was obtained in practically quantitative yield.

In an analogous manner, by reaction of the appropriate oxazinene with ammonia or isopropylamine, there were obtained the following compounds:

N-[1 - (3-methyl-phenoxy)-2-hydroxy-propyl]-N-benzyl-glycine isopropylamide (Compound 61): the reaction was carried out in isopropanol and the yield was 63% of theory; the base has a melting point of 76–80° C.;

N-[1 - (α-naphthyloxy)-2-hydroxy-propyl]-N-benzyl-glycinamide (Compound 62): the reaction was carried out in tetrahydrofuran and the yield was 91% of theory of crude product and 69% of theory of product purified by recrystallization from ethyl acetate; it had a melting point of 108–109° C.

EXAMPLE 7

N-[1-(3-methyl-phenoxy)-2-hydroxy-propyl]-glycinamide (Compound 48)

13 grams of the N-[1-(3-methyl-phenoxy)-2-hydroxy-propyl]-N-benzyl-glycinamide obtained in the manner described in Example 6 were dissolved in a mixture of 150 ml. methanol and 15 ml. water and, after the addition of 1 gram palladium-charcoal (10%), acidified with methanolic hydrochloric acid. Within a period of 10 minutes, the benzyl group was split off by catalyzed hydrogenolysis. The reaction solution was then filtered free from the catalyst and the filtrate evaporated. After recrystallization of the residue obtained from methanol, there were obtained 8.1 grams (74% of theory) N-[1-(3-methyl-phenoxy)2-hydroxy-propyl]-glycinamide in the form of its hydrochloride, which had a melting point of 189° C.

The compounds set out in the following Table IV were prepared in an analogous manner.

TABLE IV

| Compound Number | Compound chemical name | Solvent | M.P., ° C. | Yield, percent |
|---|---|---|---|---|
| 63 | N-[1-(α-naphthyloxy)-2-hydroxy-propyl]-glycine dimethylamide | Methanol/.. | [1] 190–191 | 89.9 |
| 64 | N-[1-(α-napthyloxy)-2-hydroxy-propyl]-glycine methylamide. | ...do...... | [2] 136–137 | 69.2 |
| 65 | N-[1-(3-methyl-phenoxy)-2-hydroxy-propyl]-glycine isopropylamide. | ...do...... | 74 | 76.6 |
| 66 | N-[1-(α-naphthyloxy)-2-hydroxy-propyl]-glycinamide. | ...do...... | [1] 185 | 69 |
| 67 | N-[1-(α-naphthyloxy)-2-hydroxy-propyl]-glycine N-4-methoxy-phenyl-piperazide. | ...do...... | [2] 115–116 | 87.1 |
| 68 | N-[1-(2,3-dichlorophenoxy)-2-hydroxypropyl]-glycinamide. | ...do...... | [2] 121–124 | 94 |
| 69 | N-[1-(2,3-dichlorophenoxy)-2-hydroxypropyl]-glycine isopropylamide. | ...do...... | 125–126 | 98 |
| 70 | N-[1-(2-n-propylphenoxy)-2-hydroxy-propyl]-glycinamide. | ...do...... | 98 | [3] 87; [4] 61.7 |
| 71 | N-[1-(2-n-propyl-phenoxy)-2-hydroxy-propyl]-glycine isopropylamide | ...do...... | 92 | [3] 98; [5] 71.5 |
| 72 | N-[1-(α-naphthyloxy)-2-hydroxy-propyl]-glycine isopropylamide. | ..................... | [3] 98; [4] 77.4 |  |

[1] Hydrochloride.  [2] Base.  [3] Crude product.  [4] Ispropanol.  [5] Ethyl acetate.

EXAMPLE 8

D,L-N-[1-(α-naphthyloxy)-2-hydroxy-propyl]alanine dimethyl amide (Compound 73)

10.8 grams (0.05 mole) D,L-N-[1-(α-naphthyloxy)-2-hydroxy-propyl]-amine, 18 grams (0.1 mole) D,L-α-bromopropionic acid dimethylamide and 13 grams (0.05 mole) diisopropyl-ethylamine in 50 ml. dioxane, which had been purified over aluminum oxide, were boiled for 10–15 hours. The reaction mixture was subsequently filtered, the filtrate was evaporated and the residue was taken up in ethyl acetate and the organic layer extracted with 1 N hydrochloric acid. After the aqueous phase has been rendered alkaline, there were extracted therefrom 12.4 grams (78.5% of theory) D,L-N-[1-(α-naphthyloxy)-2-hydroxy-propyl]-alanine dimethylamide; the corresponding hydrochloride had a melting point of 195–196° C.

The D,L - N - [1-(α-naphthyloxy)-2-hydroxy-propyl]-amine used as starting material can be prepared in the following manner:

60 grams (0.3 mole) α-naphthyl-glycide ether, together with 44.1 grams (0.3 mole) phthalimide, were heated under reflux for 3.5 hours in 300 ml. n-butanol in the presence of 3 ml. pyridine. The precipitate formed was subsequently filtered off with suction and the filtrate evaporated in a vacuum. The residue obtained was triturated with water and ether. There were obtained 88.5 grams (85% of theory) N-[1-(α-naphthyloxy)-hydroxy-propyl]-phthalimide (M.P. 136–138° C.) which, together with 13.6 grams (0.27 mole) hydrazine hydrate in 1.3 liters ethanol, were boiled for 2 hours. The cooled reaction mixture was subsequently acidified with hydrochloric acid, the precipitate formed was filtered off with suction, washed with water and the filtrate evaporated in a vacuum. The residue was taken up in water, rendered strongly alkaline and extracted with ether, with the addition of tetrahydrofuran. The organic layer was separated off, evaporated in a vacuum and the residue distilled at 0.2 mm. Hg. There were obtained 37.5 grams (68% of theory) D,L-N-[1-(α-naphthyloxy)-2-hydroxy - propyl]-amine, which had a boiling point of 172–182° C./0.2 mm. Hg.

In an analogous manner, by the reaction of D,L-N-[1-(α-naphthyloxy)-2-hydroxy-propyl]-amine with α-bromo-propionic acid isopropylamide, there was obtained, in a yield of 53% of theory, D,L-N-[1-(α-naphthyloxy)-2-hydroxy-propyl]-alanine isopropylamide (Compound 74), which had a melting point of 187–188° C.

The cardiac β-receptor blocking activity of a test compound can be evaluated by determination of the inhibition of the anerobic glycolysis in the myocardium of unanesthetized rats. This type of inhibition is a typical property of β-receptor blocking bio catalysts.

The tests were carried out on Sprague-Dawley rats weighing between about 160 and 200 grams. The test compounds were administered intraperitoneally to the rats which had not been anesthetized and which had been fasted for 14 hours. Fifteen minutes after administration of the test compound the animals were subjected to a deficiency gas mixture of 5% oxygen and 95% nitrogen. Five animals, for each run, were put simultaneously into a Plexiglas cage consisting of five single cells (one animal per cell each having a volume of 1.5 liters). The gas mixture was conducted through each cage for 20 minutes, the flow-through being a total of 3.5 liters for the first five minutes, then at 2.5 liters/minute for the remaining 15 minutes. After termination of the hypoxia stress, the rats were killed by striking them on the neck, and bled and their hearts were removed. The apex of the heart was quickly separated, washed with ice-cold distilled water and dried between filter paper and weighed. These heart tissue samples were wetted with 5% trichloroacetic acid to adjust them to 2 ml. of fluid/100 mg. of tissue. The samples were subsequently homogenized and centrifuged. The glycogen in the supernatant was determined in accordance with the method of Longley and Roe. The results are set forth in Table V.

The results reported below are based on tests of at least 5 rats per compound and dosage. The average of several tests results in cardiac glycogen values of between 150 and 200 mg. percent for untreated control animals and 10 to 25 mg. percent for animals under hypoxia stress. The glycogen content of the rat heart after hypoxia lasting for 20 minutes is a measure of the effectiveness of the test compounds, taking into consideration the i.v. toxicity, LD$_{50}$ doses, and the doses administered.

TABLE V.—β-RECEPTOR BLOCKING (IN RATS)

| Compound No. | LD$_{50}$ in mice (mg./kg.) | Dosage administered (mg./kg.)i.p. | Glycogen content in heart 20 minutes after hypoxia stress (mg. percent) |
|---|---|---|---|
| 1 | [1] >100 | 20 | 53 |
| 2 | [1] >100 | 10 | 65 |
|   |   | 20 | 108 |
| 3 | [1] >100 | 20 | 38 |
| 10 | [1] >100 | 20 | 212 |
| 11 | [1] >50 | 20 | 196 |
| 13 | [1] >100 | 20 | 122 |
| 14 | 204 | 10 | 51 |
|   |   | 20 | 168 |
| 17 | [1] >100 | 20 | 51 |
| 30 | [1] >100 | 10 | 33 |
| 31 | [1] >100 | 10 | 32 |
| 36 | [1] >100 | 10 | 34 |
| 37 | 87 | 10 | 49 |
| 38 | [1] >100 | 10 | 69 |
| 39 | >50 | 10 | 45 |
| 46 | 46 | 1 | 61 |
|   |   | 10 | 149 |
|   |   | 20 | 170 |
| 47 | 54 | 20 | 44 |
| 49 | [1] >100 | 10 | 30 |
| 51 | 73 | 20 | 59 |
|   |   | 50 | 76 |
| 54 | [1] >100 | 1 | 54 |
|   |   | 5 | 86 |
|   |   | 10 | 102 |
|   |   | 20 | 165 |
| 55 | 35 | 1 | 30 |
|   |   | 20 | 152 |
| 56 | 99 | 1 | 62 |
|   |   | 5 | 90 |
|   |   | 20 | 117 |
| 62 | ~60 | 10 | 27 |
| 66 | >100 | 20 | 53 |
| 70 | >50 | 20 | 52 |
| 71 | ~60 | 20 | 49 |
| 12 | [1] >100 | 20 | 193 |
| A[2] | 70 | 10 | 19 |
|   |   | 50 | 52 |

[1] With these test compounds, it was not possible to determine a LD$_{50}$ (dose at which 50% of the animals die) in i.v. administration due to insufficient solubility of the test compound.
[2] Compound A is 1-p-nitrophenyl-2-isopropylamino-ethanol (INPEA)

The test results show that all of the compounds illustrative of the present invention possess either a greater effectiveness, a comparative protective effect at a lesser dosage, or a lower toxicity, than the comparison compound. The comparison compound, 1-p-nitrophenyl-2-isopropylamino-ethanol, (known in the trade under the name Inpea), does not protect at a dosage of 10 mg./kg. i.p.; only at a dose of 50 mg./kg. i.p. does it show an incomplete degree of protection against the impoverishment of glycogen occurring under hypoxia stress. The compounds according to the present invention are thus unexpectedly superior in effectiveness to known compounds and thus present a valuable contribution to the art.

The dosage of the novel compounds of the present invention depends on the age, weight, and condition of the patient being treated. Generally speaking, for aduloral administration, the preferred unit dosage of active compound with a suitable pharmaceutical diluent or lubricant is 1 mg.–40 mg. four times a day. In general the oral dosage is 20–40 mg., whereas the intravenous dosage is generally 1–5 mg., four times a day.

The new compounds can be administered in conventional ways. For example, for oral administration the active compounds can be administered in liquid or solid dosage forms. Solid forms include capsules, tablets, powders, pills and the like and the liquid form include suitably flavored aqueous suspensions and solutions (depending on concentration desired) and flavored oil suspensions and solutions wherein edible oils such as corn oil, cotton seed oil, coconut oil, peanut oil, sesame oil or mixtures of these and the like can be employed.

For preparing compounds such as tablets and other compressed formulations, the compounds can include any compatible and edible tableting material used in pharmaceutical practice as for example, corn starch, lactose, stearic acid, magnesium stearate, talc, methyl cellulose and the like.

Similarly the compounds of the present invention can be mixed with suitable adjuvants for the preparation of

What is claimed is:

1. Amino acid derivative of the formula

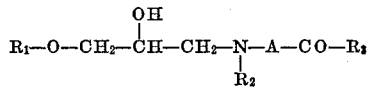

wherein $R_1$ is aryl containing 6 to 10 carbon atoms, which may be substituted once or twice by halogen or hydroxyl, alkoxy, alkenyl, alkenyloxy, alkyl, alkoxyalkyl, trifluoroalkyl, or alkylcarboxylamino; $R_2$ is hydrogen, alkyl or phenylalkyl; $R_3$ is hydroxyl or alkoxy; and A is methylene which may carry one or more alkyl groups or a phenylalkyl, carboxyalkyl, or carbalkoxyalkyl group; and wherein all alkyl or alkenyl groups in $R_1$, $R_2$, $R_3$ and A contain up to 4 carbon atoms; and the physiologically compatible salts of such derivatives.

2. Amino acid derivative as claimed in claim 1 wherein $R_1$ is unsubstituted naphthyl.

3. Amino acid derivative as claimed in claim 1 wherein $R_1$ is phenyl substituted with at least one member of the group selected from halogen, alkyl, alkoxy, alkenyl, and alkenyloxy.

4. Amino acid derivative as claimed in claim 2 in which $R_2$ is hydrogen, alkyl, or benzyl.

5. Amino acid derivative as claimed in claim 3 in which $R_2$ is hydrogen, lower alkyl, or benzyl.

6. Amino acid derivative as claimed in claim 1 wherein said derivative is N-[1-(α-naphthyloxy)-2-hydroxypropyl]-D,L-alanine.

7. Amino acid derivative as claimed in claim 1 wherein said derivative is N-[1-(α-naphthyloxy)-2-hydroxypropyl]-D,L-α-alanine-isopropylester.

8. Compound as claimed in claim 1, designated N-[1-(α - naphthyloxy)-2-hydroxy-propyl]-α-amino-isobutyric acid.

9. Compound as claimed in claim 1, designated N-[1-(2 - allyl-phenoxy)-2-hydroxy-propyl]-α-amino-isobutyric acid.

References Cited
UNITED STATES PATENTS 3,541,130  11/1970  Koppe et al. ......... 260—519

LORRAINE A. WEINBERGER, Primary Examiner
L. A. THAXTON, Assistant Examiner

U.S. Cl. X.R.

260—268 C, 470, 519, 559 A; 424—250, 309, 319, 324